(12) United States Patent
Kim et al.

(10) Patent No.: US 12,207,778 B2
(45) Date of Patent: Jan. 28, 2025

(54) DISHWASHER AND WATER JACKET INCLUDED IN SAME

(71) Applicant: LG Electronics Inc., Seoul (KR)

(72) Inventors: Sangjin Kim, Seoul (KR); Minchul Kim, Seoul (KR); Tae Hwan Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 263 days.

(21) Appl. No.: 17/923,716

(22) PCT Filed: Jun. 8, 2020

(86) PCT No.: PCT/KR2020/007368
§ 371 (c)(1),
(2) Date: Nov. 7, 2022

(87) PCT Pub. No.: WO2021/225211
PCT Pub. Date: Nov. 11, 2021

(65) Prior Publication Data
US 2023/0172422 A1    Jun. 8, 2023

(30) Foreign Application Priority Data
May 8, 2020 (KR) ........................ 10-2020-0055229

(51) Int. Cl.
*A47L 15/42*    (2006.01)
*F16K 15/03*    (2006.01)
*F16K 31/20*    (2006.01)

(52) U.S. Cl.
CPC ....... *A47L 15/4223* (2013.01); *A47L 15/4217* (2013.01); *F16K 15/03* (2013.01); *F16K 31/20* (2013.01)

(58) Field of Classification Search
None
See application file for complete search history.

(56) References Cited

U.S. PATENT DOCUMENTS

| | | |
|---|---|---|
| 7,896,976 B2 | 3/2011 | Graf et al. |
| 9,492,053 B2 | 11/2016 | Shin et al. |
| 2005/0241675 A1 | 11/2005 | Jung et al. |
| 2008/0072933 A1 | 3/2008 | Graf et al. |
| 2013/0032181 A1 | 2/2013 | Shin et al. |

FOREIGN PATENT DOCUMENTS

| | | |
|---|---|---|
| CN | 108968864 | 12/2018 |
| DE | 29722975 | 2/1998 |
| EP | 1792000 | 8/2008 |
| JP | 2005296544 | 10/2005 |
| KR | 20070053227 | 5/2007 |
| KR | 101054104 | 8/2011 |
| KR | 101247049 | 4/2013 |

*Primary Examiner* — Rita P Adhlakha
(74) *Attorney, Agent, or Firm* — Fish & Richardson P.C.

(57) ABSTRACT

A dishwasher includes a water jacket. The water jacket includes a water discharge path configured to discharge wash water to an outside of the dishwasher, a chamber in fluid communication with an upper end of the water discharge path, a check valve disposed inside the chamber, and a hinge disposed in the chamber and connected to the check valve. The check valve includes a floating portion with an empty inside. The specific gravity of the floating is smaller than that of water.

20 Claims, 13 Drawing Sheets

(a)  (b)

DISHWASHER AND WATER JACKET INCLUDED IN SAME

CROSS-REFERENCE TO RELATED APPLICATIONS

This application is a National Stage application under 35 U.S.C. § 371 of International Application No. PCT/KR2020/007368, filed on Jun. 8, 2020 which claims the benefit of Korean Patent Application No. 10-2020-0055229, filed on May 8, 2020. The disclosures of the prior applications are incorporated by reference in their entirety.

TECHNICAL FIELD

The present disclosure relates to a water jacket configured to prevent backflow of wash water and a dishwasher included in same.

BACKGROUND ART

A dishwasher is a home appliance configured to wash off contaminants such as food scraps or waste on washing targets including dishes or cooking utensils by using a washing detergent and wash water.

In general, such a dishwasher may include a case, a tub disposed inside the case and configured to provide a washing space, a rack provided inside the tub and configured to receive dishes, a spray arm configured to spray wash water to the rack, a sump in which wash water is stored, and a washing pump configured to supply the wash water stored in the sump to the spray arm. Wash water may be sent in front of the spray arm and the wash water may be sprayed at a high pressure through a spray hole formed in the spray arm. The wash water sprayed at a high pressure may hit a surface of a washing target to remove foreign substances remaining on the washing target.

Meanwhile, a water jacket may be disposed between the case and the tub. The water jacket may perform a function of supplying wash water to the sump and discharge the wash water stored in the sump. The water jacket may include a storage for storing wash water, a water supply line for supplying water to the storage, and a water discharge line for discharging the wash water stored in the sump.

FIG. shows a structure of a conventional dishwasher.

FIG. 1 is a drawing disclosed in DE29,722,975 U1. Referring to FIG. 1, a valve body 11 may be provided between a discharge line 2 and a ventilation hole.

FIG. 2 is a view showing a structure of another conventional dishwasher.

FIG. 2 is a drawing disclosed in EP01,792,000B1. Referring to FIG. 2, a valve body 7 is disposed in a first region 91.

The technical features according to prior discloses a floating valve in which an air pocket is formed (i.e., the valve body 11 of FIG. 1) or the valve body 7 of FIG. 2, to prevent backflow of wash water. However, when the floating valve moves vertically according to the conventional technical features of the prior art, a gap in a lateral direction might occur and thus the wash water might flow through the air pocket disadvantageously.

DESCRIPTION OF DISCLOSURE

Technical Problems

Accordingly, an object of the present disclosure is to address the above-noted and other problems and to provide a water jacket that may effectively prevent backflow of wash water, and a dishwasher included in same.

Another object of the present disclosure is to provide to a water jacket that may prevent non-operation of a check valve, and a dishwasher included in same.

A further object of the present disclosure is to provide a water jacket that may solve chattering of a check valve and sticking by contaminants, and a dishwasher included in same.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

To solve the above-noted and other problems, a water jacket may include a hinge formed inside a chamber and a check valve may be disposed inside the chamber through the hinge, thereby securing the check valve to a constant position inside the chamber and then effectively preventing backflow of wash water.

In addition, the height of the hinge may be greater than that of a lowermost end of the check valve in the water jacket according to the present disclosure to increase the buoyancy of the check valve, thereby effectively preventing backflow of wash water.

In addition, the height of a support portion formed inside the chamber may be greater than that of a lowermost end of the check valve in the water jacket according to the present disclosure, thereby preventing non-operation of a check valve, increasing the buoyancy of the check valve, and effectively preventing backflow of wash water.

In addition, the specific gravity of the check valve may be smaller than that of water in the water jacket according to the present disclosure, thereby increasing the buoyancy of the check valve, and effectively preventing backflow of wash water.

In addition, a prevention member may be attached to the inside of the chamber in the water jacket according to the present disclosure, thereby preventing sticking by contaminants and leakage of wash water.

According to an embodiment of the present disclosure, a water jacket provided in a dishwasher may include a water discharge path configured to discharge wash water outside the dishwasher; a chamber in communication with an upper end of the water discharge path; and a check valve disposed inside the chamber. A lower end of the chamber may be in communication swig an upper end of the water discharge path, and a hole may be formed in an upper end of the chamber. The check valve may include an opening/closing portion configured to open and close the hole; a floating portion formed in a lower end of the opening/closing portion; and a connection portion extending to the outside of the floating portion and configured to connect the floating portion to the hinge. The support portion may be configured to limit downward movement of the check valve. With respect to a lower surface of the chamber, the height of a lowermost end of the floating portion may be smaller than that of a lower end of the hinge or greater than that of an uppermost end of the support portion.

According to another embodiment of the present disclosure, a water jacket provided in a dishwasher may include a water discharge path configured to discharge wash water outside the dishwasher; a chamber in communication with an upper end of the water discharge path; and a check valve disposed inside the chamber. One surface of the chamber may be in communication with one surface of the water discharge path, and a hole may be formed in an upper end of the chamber and a hinge connected to the check valve is formed inside the chamber. The check valve may include an opening/closing portion configured to open and close the hole; a floating portion formed in a lower area of the opening/closing portion; and a connection portion extending to the outside of the floating portion and configured to connect the floating portion to the hinge.

According to a further embodiment of the present disclosure, a dishwasher may include a case; a tub mounted inside the case; a sump disposed underneath the tub and configured to store wash water; a water jacket disposed between the case and the tub and configured to supply the wash water to the sump or discharge the wash water stored in the sump. The water jacket may include a water discharge path configured to discharge wash water outside the dishwasher; a chamber in communication with an upper end of the water discharge path; and a check valve disposed inside the chamber. One surface of the chamber may be in communication with one surface of the water discharge path, and a hole may be formed in an upper end of the chamber and a hinge connected to the check valve is formed inside the chamber. The check valve may include an opening/closing portion configured to open and close the hole; a floating portion formed in a lower area of the opening/closing portion; and a connection portion extending to the outside of the floating portion and configured to connect the floating portion to the hinge.

Advantageous Effect

The present disclosure may have following advantageous effects. According to the present disclosure, the water jacket may have an advantage of effectively preventing backflow of wash water.

Furthermore, the water jacket according to the present disclosure may an effect of preventing non-operation of a check valve.

Still further, the water jacket according to the present disclosure may have an effect of solving chattering of a check valve and sticking by contaminants.

Specific effects are described along with the above-described effects in the section of Detailed Description.

DETAILED DESCRIPTION OF EXEMPLARY EMBODIMENT

Figure 1:
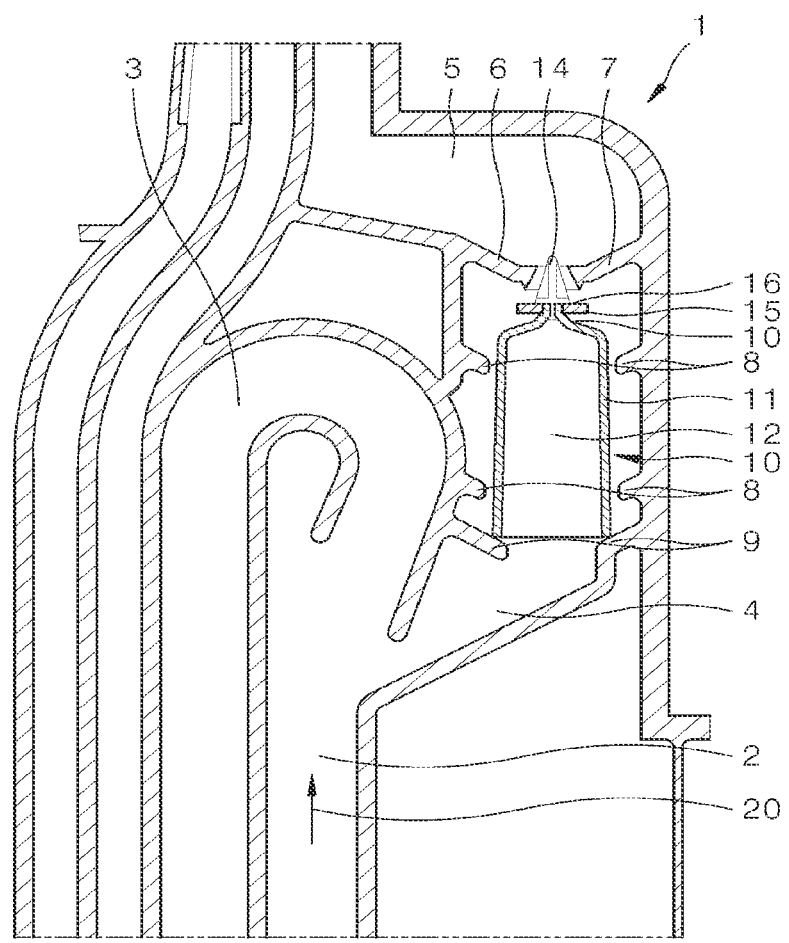
FIGS. 1 and 2 are views showing a structure of conventional dishwasher according to prior art.
Figure 2:
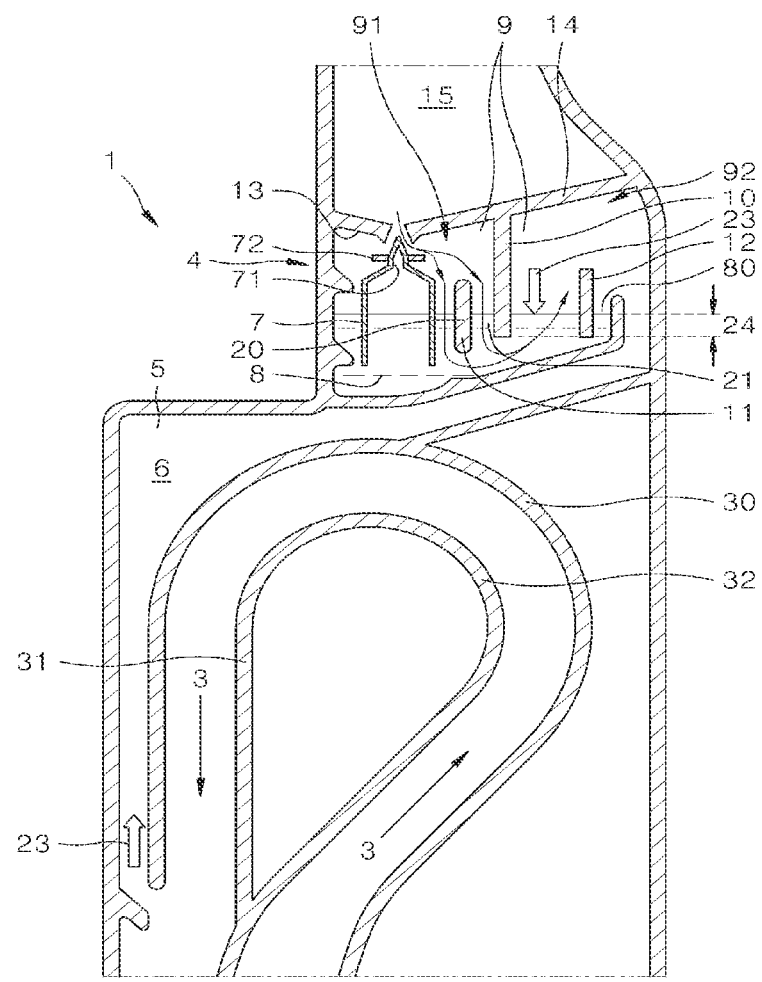

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary.

Hereinafter, expressions of 'a component is provided or disposed in an upper or lower portion' may mean that the component is provided or disposed in contact with an upper surface or a lower surface. The present disclosure is not intended to limit that other elements are provided between the components and on the component or beneath the component.

It will be understood that when an element is referred to as being "connected with" or "coupled to" another element, the element can be directly connected with the other element or intervening elements may also be present. In contrast, when an element is referred to as being "directly connected with" another element, there are no intervening elements present.

Throughout the disclosure, each element may be singular or plural, unless stated to the contrary.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Hereinafter, a dishwasher according to several embodiments of the present disclosure will be described.

[Basic Structure of Dishwasher]

Figure 3:
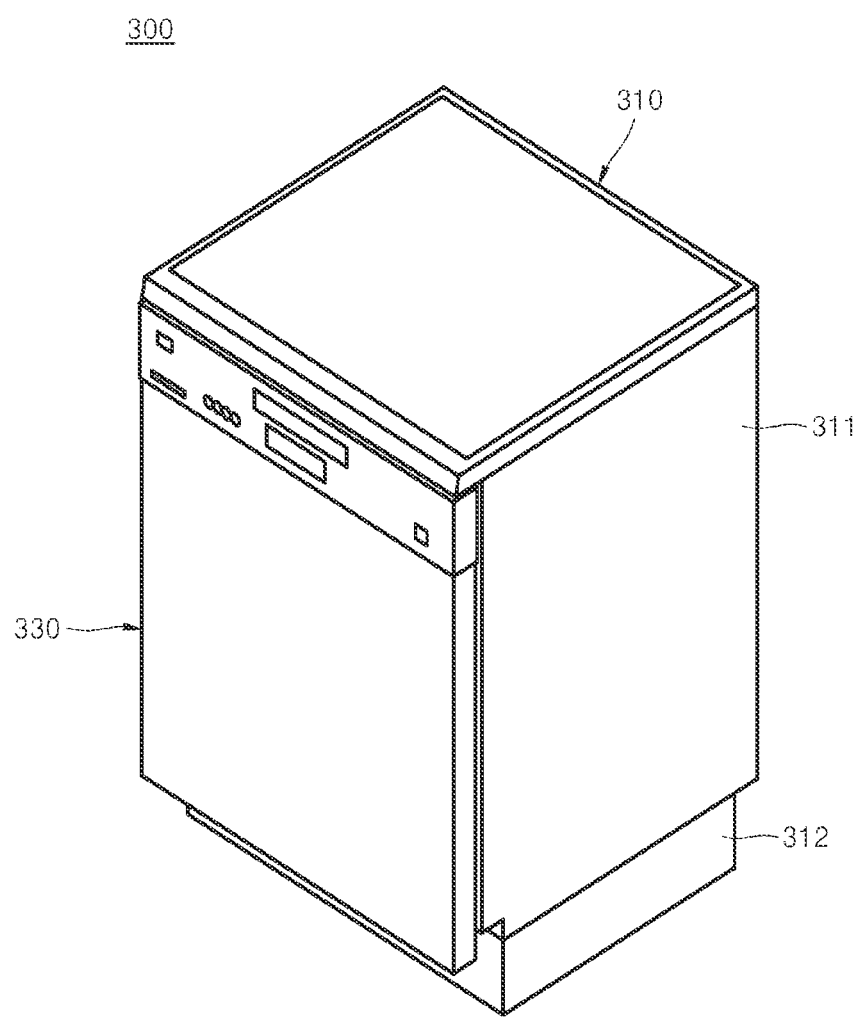
FIG. 3 is a perspective view showing a dishwasher according to an embodiment of the present disclosure, viewed from a right upper side.
Figure 4:
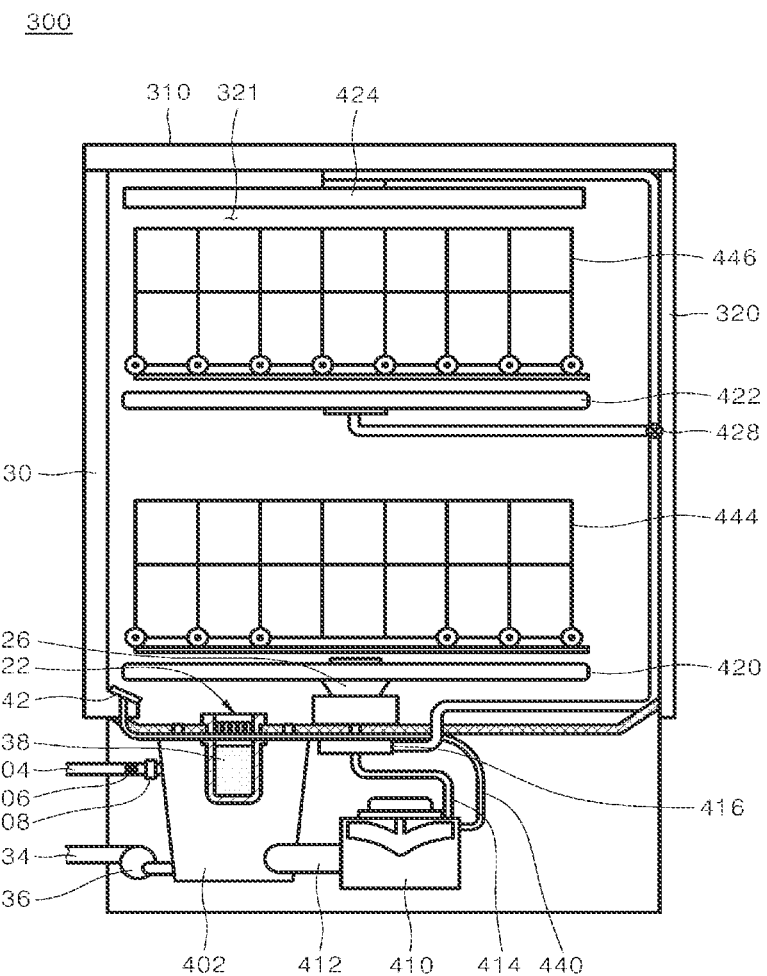
FIG. 4 is a sectional view showing a dishwasher according to an embodiment of the present disclosure.

FIG. 3 is a perspective view showing a dishwasher according to an embodiment of the present disclosure, viewed from a right upper side. FIG. 4 is a sectional view showing a dishwasher according to an embodiment of the present disclosure.

Referring to FIGS. 3 and 4, a basic structure of a dishwasher 300 will be described in detail. The water drawn into the dishwasher 300 to wash dishes, the water used in a dishwashing process, and the water flowing inside the dishwasher to be discharged after the dishwashing process will be referred to as 'wash water' for dishwashing.

The case 310 may define an exterior design of the dishwasher 300, and partition off an inner space of the dishwasher into an upper space 311 and a lower space 312.

The tub 320 may be provided inside the upper space 311 of the case 310. The tub 320 may be formed in a hexadral shape with an open front. However, the shape of the tub 320 may not be limited thereto and include various shapes.

A washing chamber 321 is formed inside the tub 320 and washing targets (e.g., dishes, bottles and the like) may be disposed in the washing chamber 321. A connection hole 322 may be formed in a bottom of the tub 320 to supply wash water to a swap 402.

A door 303 may be coupled to a front of the tub 320 and configured open and close the washing chamber 321. The door 330 may be automatically or manually opened and closed.

The sump 402 may be disposed underneath the bottom of the tub 320, that is, in the lower space 312 of the case 310. The sump 402 may be configured to store wash water and collect the wash water having washed washing targets. The sump 402 may be supplied wash water through a water jacket, which will be described in detail as follows.

The sump 402 may be connected to a first water supply path 404 through which the wash water supplied from an external water supply source flows. A water supply valve 406 may be configured to move the wash water supplied from an external water supply source to the sump 402. When the water supply valve 406 is open, the wash water supplied from the external water supply source may be drawn into the sump 402 through the first water path 404.

The first water supply path 404 may include a first flowmeter 408. The first flowmeter 408 may be configured to measure the flow rate of the wash water flowing into the sump 402.

A plurality of racks 444 and 446 may be disposed inside the washing chamber 321 and configured to store washing targets (e.g., dishes and bottles).

The plurality of racks 444 and 446 may include a lower rack 333 disposed in a lower area of the washing chamber 321 and an upper rack 446 disposed in an upper area of the washing chamber 321. The lower rack 444 and the upper rack 446 may be vertically spaced a preset distance apart from each other, and slidingly movable outward through the front of the tub 320. A user can place and store washing targets in the retracted lower rack 424 and upper rack 446.

A washing pump 410 may be connected to the sump 402 through a water collection path 412. The washing pump 410 may be configured to supply the wash water stored in the sump 402 to a plurality of spray arms 420, 422 and 424. To this end, the washing pump 410 may include a washing motor configured to generate a rotational force.

Although not shown in the drawings, a first check valve may be disposed inside the water collection path 412, that is, between the sump 402 and the washing pump 410. The first check valve may be opened toward the washing pump 410 inside the sump 402. Specifically, the first check valve may be opened toward the washing pump 410 inside the sump 402. In other words, the first check valve may get opened to allow wash water to flow from the sump 402 to the washing pump 410, and closed to allow wash water not to flow from the washing pump 410 to the sump 402. When wash water is flowing by driving the washing pump 410. When wash water is not flowing by stopping the drive of the washing pump 410, the first check valve may be closed. A lower area of the first check valve is rotated on an upper area thereof by the flow pressure of the wash water applied by the washing pump 410, to open the first check valve. As one example, the first check valve may be a solenoid valve configured to be open and closed by an electronic signal.

When the washing pump 410 is driving, the wash water stored in the sump 402 may be drawn into the washing pump 410 through the water collection path 412. The drawn wash water may be transferred to a switching valve 416 through a wash water supply path 414.

A second switching valve 418 together with the first switching valve 416 may be configured to selectively supply the wash water transferred by the washing pump 410 to at least one of the plurality of spray arms 420, 422 and 424. In other words, the switching valves 416 and 418 may be configured to selectively connect the washing pump 410 to at least one of the plurality of spray arms 420, 422 and 424.

The plurality of spray arms 420, 422 and 424 may be configured to spray wash water into the washing chamber 321. The plurality of spray arms 420, 422 and 424 may include a lower spray arm 420, an upper spray arm 422 and a top spray arm 424, which are vertically spaced a preset distance apart from each other.

The switching valves 416 and 418 may be connected to a plurality of spray arm paths 426 and 328 and configure to supply wash water to the plurality of spray arms 420, 422 and 424. The spray arm connection paths 426 and 328 may include a lower spray arm connection path 426 configured to supply wash water to the lower spray arm 420, and an upper spray arm connection path 428 configured to supply wash water to the upper spray arm 422 and the top spray arm 424.

The lower spray arm 420 may be disposed at a lowermost point inside the washing chamber 321 and configured to spray wash water toward the lower rack 444 from a lower area to an upper area. The upper spray arm 422 may be disposed in a middle area above the lower spray arm 420 inside the washing chamber 321, and configured to spray wash water toward the upper rack 446 in an upward direction. The top spray arm 424 may be disposed in an uppermost point of the washing chamber 321 and configured to spray wash water in an upward direction.

A first water discharge path 434 may be connected to the sump 402. The first water discharge path 434 may be configured to transfer the wash water stored in the sump 402 to a water jacket which will be described below.

A water discharge pump 436 may be configured to discharge the wash water stored in the sump 402 through the first water discharge path 434. The water discharge pump 436 may include a water discharge motor configured to generate a rotational force. When the water discharge pump 436 operates, the wash water stored in the sump 402 may be discharged outside the case 310 through the first water discharge path 434.

A filter 438 may be coupled to a connection hole 322 and configured to filter contaminants from the wash water flowing to the sump 402.

Although not shown in the drawings, the dishwasher 300 may further include a heater.

The heater may be coupled to a lower side of the washing pump 420 and configured to heat the wash water stored in the washing pump 420. When the washing pump 420 operates, the heater may heat wash water flowing inside the washing pump 420 to generate heated water. The heater may generate steam by heating the wash water held in the washing pump 420, while maintaining a water level of the wash water remaining inside the washing pump 420 at a predetermined value or more. Accordingly, when the washing pump 420 is driving, the heater may heat the wash water remaining inside the washing pump 420 and generate steam. When the driving of the washing pump 420 is stopped, the heater may heat the wash water stored in the washing pump 420 and generate steam.

The heated water generated by the heater may be sprayed into the tub 320 through at least one of the plurality of spray arms 420, 422 and 424. The steam generated by the heater may flow along a steam hose 440 to be discharged into the washing chamber 321 through a steam nozzle 442.

Although not shown in the drawings, the dishwasher 300 may further include a controller.

The controller may be implemented to control driving of components provided in the dishwasher 300 to control the operation of the dishwasher 300. The controller may be a processor-based device. The processor may include one or more of a central processing unit, an application processor or a communication processor.

[Water Jacket]

Figure 5:
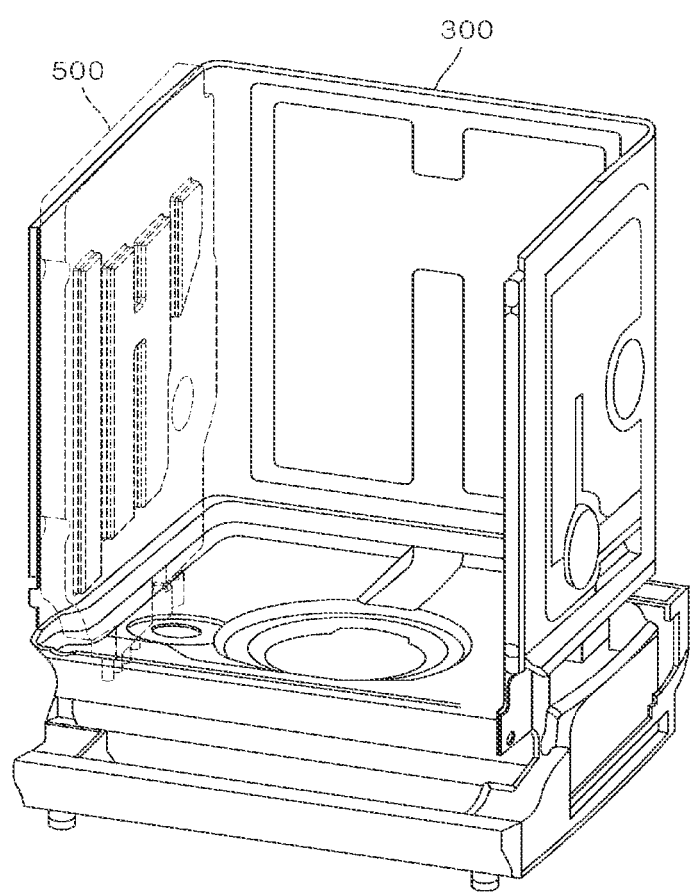
FIG. 5 is a view showing a state where a water jacket is disposed in a dishwasher according to an embodiment of the present disclosure.
Figure 6:
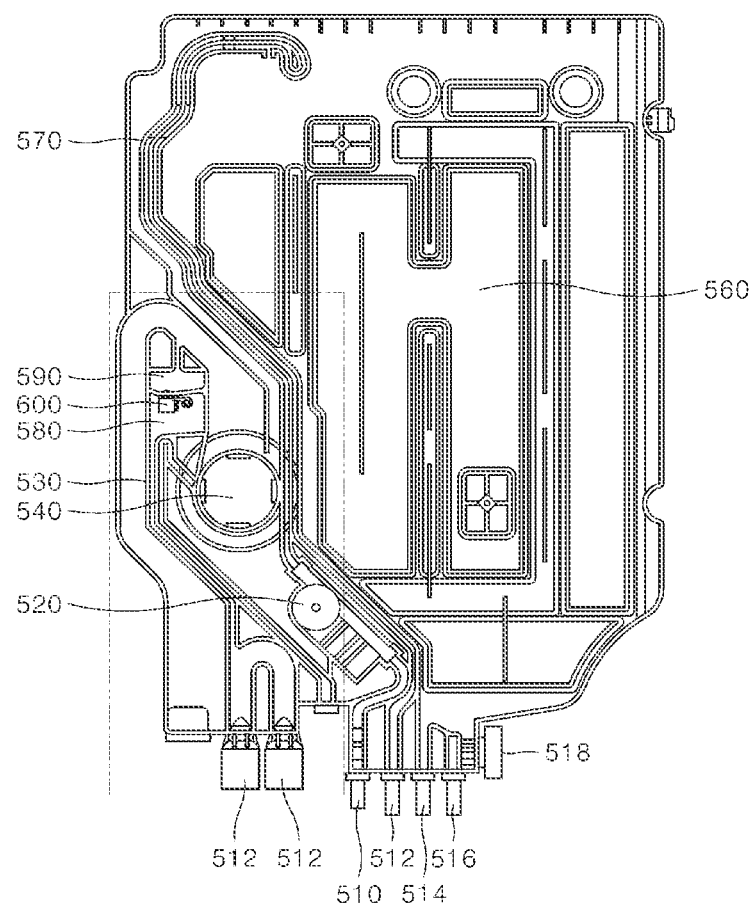
FIG. 6 is a view showing a structure of a water jacket according to an embodiment of the present disclosure.
Figure 7:
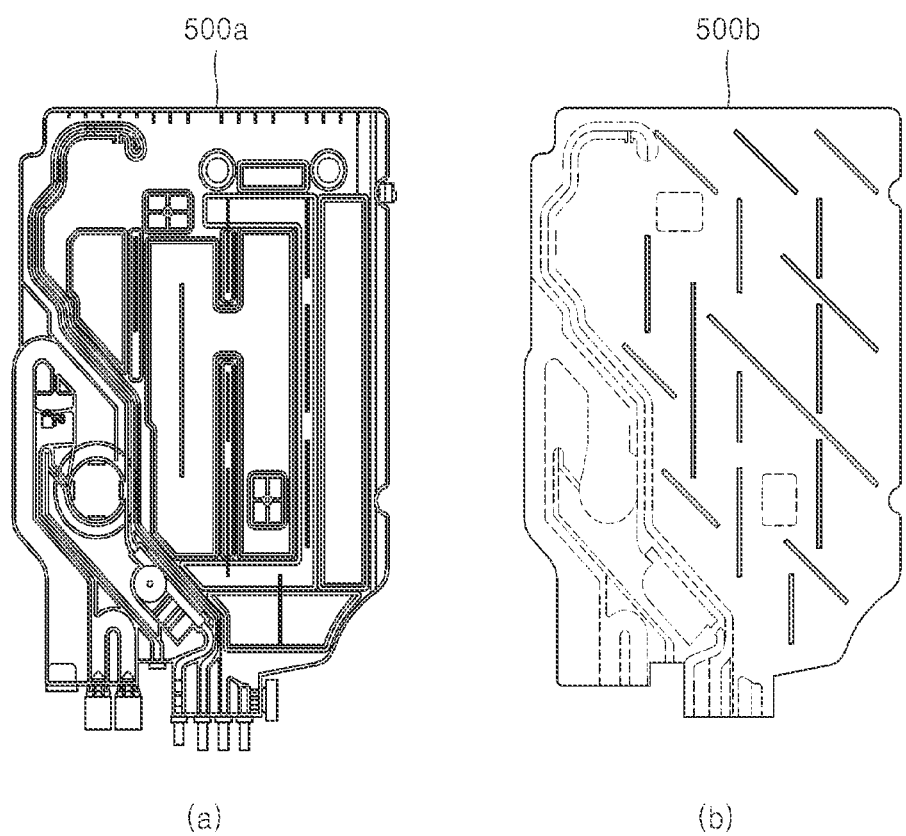
FIG. 7 is a view showing a frame and a guide cover that constitute a water jacket according to an embodiment of the present disclosure.

FIG. 5 is a view showing a state where a water jacket is disposed in a dishwasher according to an embodiment of the present disclosure. FIG. 6 is a view showing a structure of a water jacket according to an embodiment of the present disclosure. FIG. 7 is a view showing a frame and a guide cover that constitute a water jacket according to an embodiment of the present disclosure.

Referring to FIGS. 5 to 7, a structure of a water jacket 500 will be described in detail.

The water jacket 500 may be disposed between the case 310 and the tub 320. The water jacket 500 may be configured to supply wash water to the sump 402 and discharge the wash water stored in the sump 402.

The water jacket 500 may be formed by coupling a frame 500a and a guide cover 500b to each other. The frame 500a and the guide cover 500b may define both lateral surfaces of the water jacket 500, and a second water supply path 570, a storage 560 and a second water discharge path 530 may be formed between the frame 500a and the guide cover 500b.

The frame 500a may be disposed to face one lateral surface of the tub 320, The guide cover 500b may be disposed to face the case 310. The guide cover 500b and the frame 500a may be coupled to each other by a fusion method.

The storage 560 may be configured to store wash water. The second water supply path 570 may supply wash water to the storage 560. The water jacket 500 may include a water supply hose connection hole 510 through which raw water passes from a raw water pipe, that is wash water, and a second flowmeter 520 configured to sense the amount of the raw water coming through the water supply hose connection hole 510.

In addition, the water jacket 500 may include a tub hole 540. The tub hole 540 may facilitate communication between the second water supply path 570 and the tub 320, and air may be drawn into the tub hole 540. In addition, some of the wash water leaking from the second water supply path 570 may be drawn into the tub 320 through the tub hole 540. The tub hole 540 may be formed in the frame 500a disposed in contact with the tub 320, and a hole may be also formed in the tub 320 at a position corresponding to the tub hole 540.

The water jacket 500 according to the present disclosure may further include a first softening device connection hole 512a configured to sent the wash water introduced through the second water supply path 570 to a softening device (not shown); and a second softening device connection hole 514 through which the wash water having passed through the softening device is introduced.

The water jacket 500 according to the present disclosure may further include a supply pipe connection hole 516 configured to sense the wash water stored in the storage 560 to the sump 402. A solenoid valve 518 configured to adjust the wash water discharged through the supply pipe connection hole 516 or opening and close the supply pipe connection hole 516 may be disposed on the supply pipe connection hole 516.

To discharge the wash water having completed the dishwashing outside by using the water discharge pump 346, the water jacket 500 may further include a sump discharge connection hole 552 connected to the sump 402, and a water discharge hose connection hole 554 configured to discharge the wash water moved to the sump water discharge connection hole 552 outside along the second water discharge path 530 formed in the water jacket 500.

Referring to the above description, the flow of wash water inside the water jacket 500 will be described.

The wash water introduced through the water supply hose connection hole 510 may flow along the second water supply path 570. The wash water moved to the second water supply path 570 may be drawn into the softening device through the first softening device connection hole 512. The wash water flowing into the softening device may be softened to facilitate the dishwashing by filtering impurities contained in raw water filtered through an ion exchange resin filter formed in the softening device.

The wash water softened by the softening device may flow into the second softening device connection hole 514, and the softened wash water may be stored in the storage 560. The wash water stored in the storage 560 may flow into the sump 402 through the water supply pipe connection hole 516. The water supply pipe connection hole 516 may be configured to supply the wash water to the sump 402, when the solenoid valve 518 is opened.

Then, the wash water contaminated after the dishwashing may flow along the second water discharge path 530 through the sump water discharge connection hole 552, and may be discharged outside the dishwasher 300 along the water discharge hose (not shown) connected with the water discharge hose connection hole 554.

Meanwhile, a chamber 580 and a ventilation duct 590 may be formed inside the water jacket 500.

One surface of the chamber 580 may be in communication with one surface of the second water discharge path 530. As one example, the second water discharge path 530 may be formed in a longitudinal direction of the water jacket 500 and some area of a lower surface of the chamber 580 may be in communication with an upper end of the second water discharge path 530.

The ventilation duct 590 may be disposed above the chamber 580. A hole may be formed in an upper surface of the chamber 580 so that the ventilation duct 590 and the chamber 580 may be in communication with each other through the hole.

Figure 8:
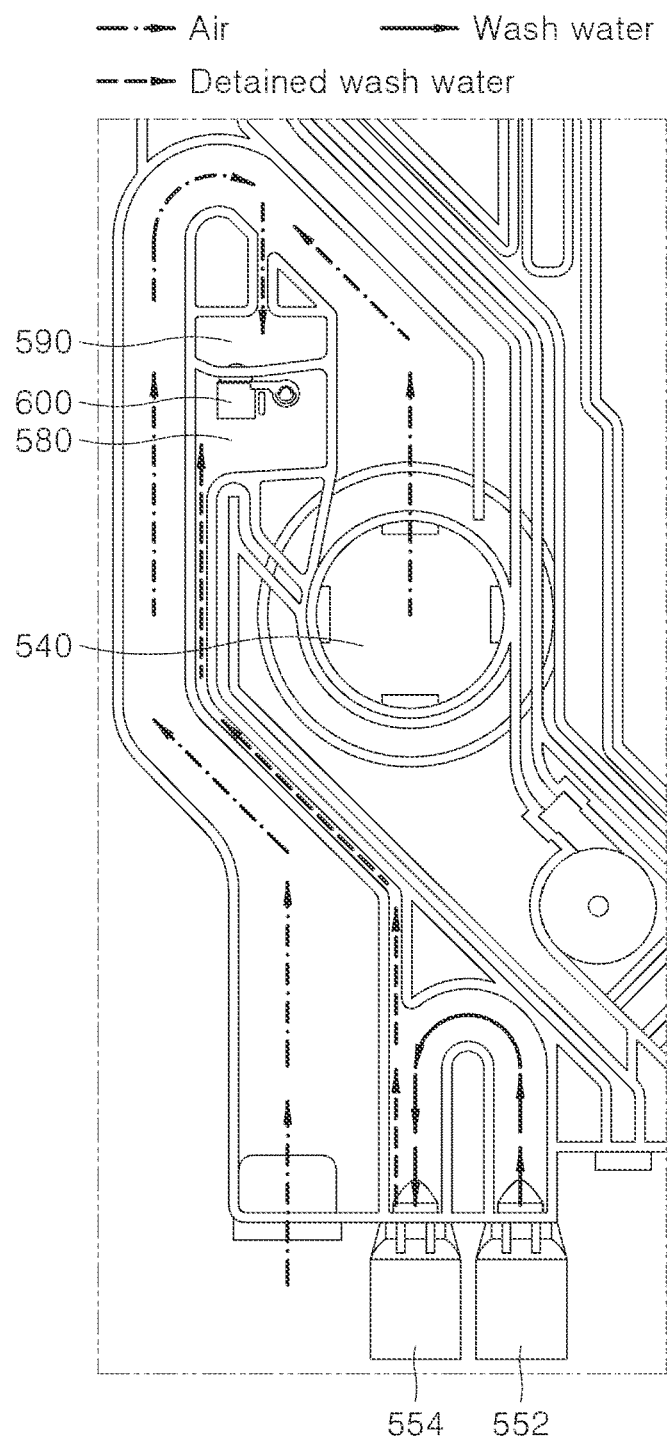
FIG. 8 is a view to describe movement flow of air and wash water inside a water jacket according to an embodiment of the present disclosure.

Air may be introduced into the ventilation duct 590. Here, air may be at least one of internal air of the tub 310 drawn through the tub hole 540 and external air of the dishwasher 300, which is shown in FIG. 8.

Meanwhile, if the water discharge hose connected to the water discharge hose connection hole 554 is disposed at a low height, the wash water flowing in the water discharge hose might backflow. The backflowing wash water could flow into the water discharge hose connection hole 554 and then flow to an upper end of the second water discharge path 530, thereby filling in the chamber 580 to at least certain water level, which is shown in FIG. 8.

Accordingly, a second check valve 600 may be provided inside the chamber 580 to prevent backflow of the dishwasher and to naturally discharge the wash water.

[Second Check Valve]

Figure 9:
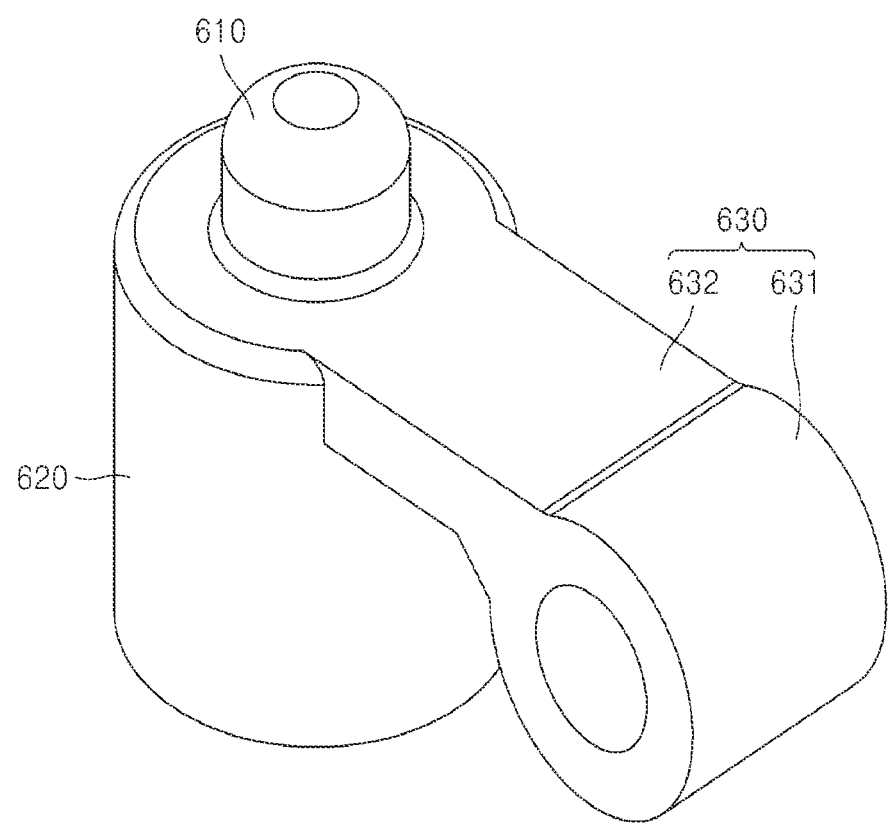
FIG. 9 is an upper perspective view of a second check valve according to an embodiment of the present disclosure.
Figure 10:
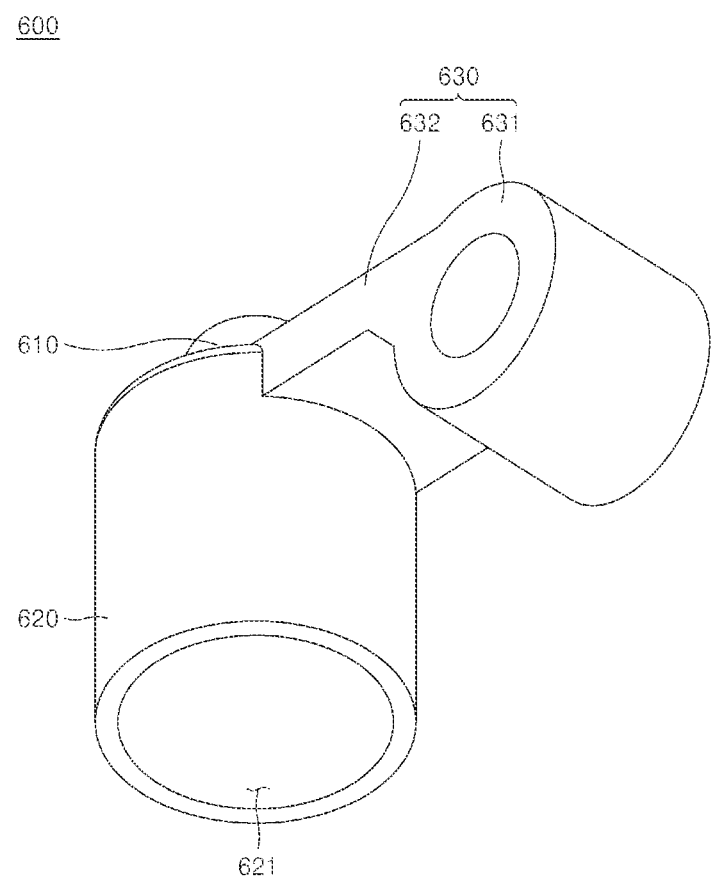
FIG. 10 is a lower perspective view of a second check valve according to an embodiment of the present disclosure.
Figure 11:
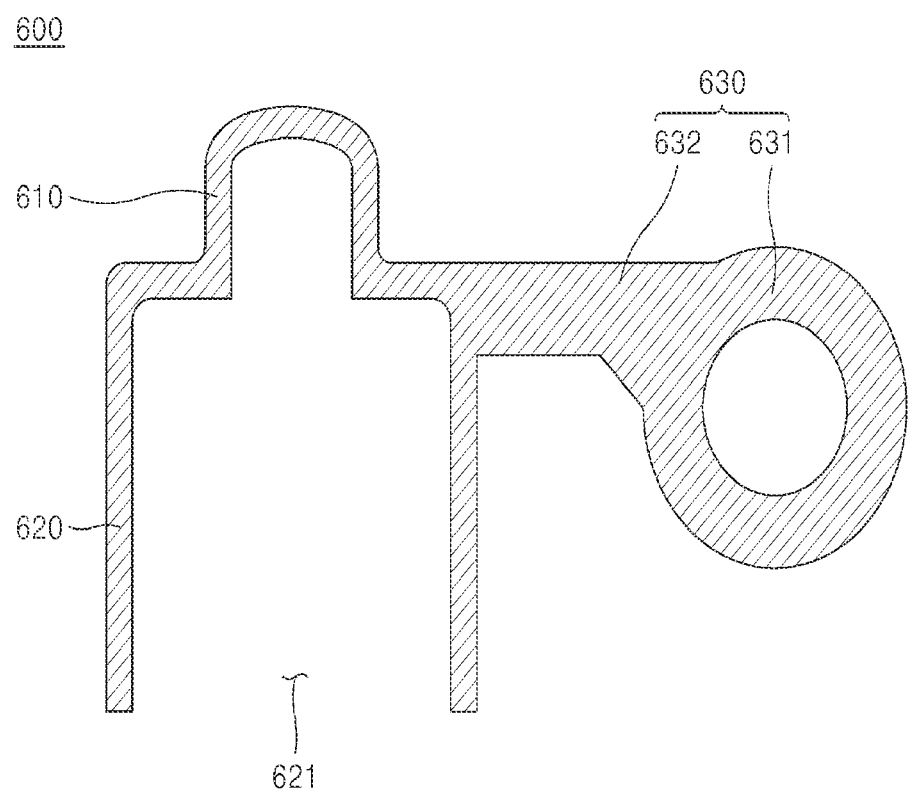
FIG. 11 is a sectional view of a second check valve according to an embodiment of the present disclosure.
Figure 12:
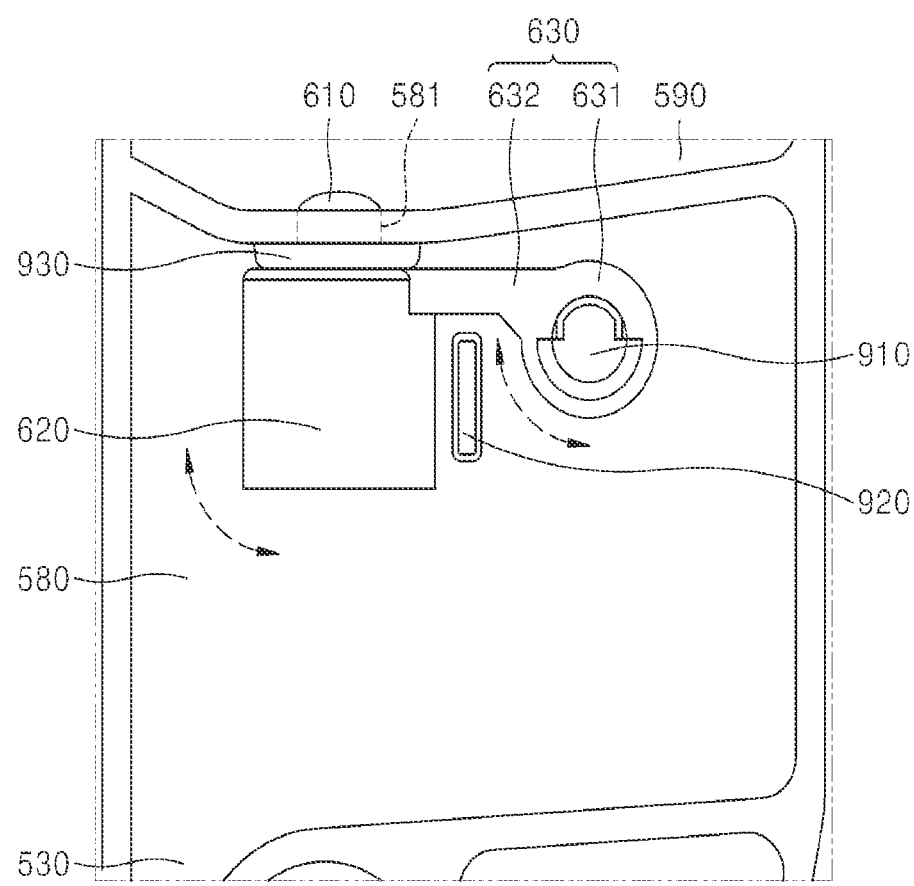
FIG. 12 is a view to describe the concept of moving a second check valve according to an embodiment of the present disclosure.

FIG. 9 is an upper perspective view of a second check valve 600 according to an embodiment of the present disclosure. FIG. 10 is a lower perspective view of a second check valve 600 according to an embodiment of the present disclosure. FIG. 11 is a sectional view of a second check valve 600 according to an embodiment of the present disclosure. FIG. 12 is a view to describe the concept of moving a second check valve 600 according to an embodiment of the present disclosure.

Hereinafter, referring to FIGS. 9 to 12, the second check valve 600 will be described in detail.

The second check valve 600 may be disposed inside the chamber 580. Specifically, a hinge 910 is formed in the chamber 580 and the second check valve 600 may be coupled to the hinge 910 to move upward and downward. More specifically, the second check valve 600 may be rotatable with respect to the hinge 910 in a vertical direction.

The second check valve 600 may include an opening/closing portion 610, a floating portion 620 and a connecting portion 630.

The opening/closing portion 610 may be configured to perform opening and closing for the hole 581 formed in the upper end of the chamber 580. The opening/closing portion 610 may have a shape protruding from an upper end of the floating portion 620.

In this instance, a predetermined area of the opening/closing portion 610 may pass through the hole 581 to close the hole 581 as shown in FIG. 12. To this end, an inner diameter of the hole 581 may be smaller than an outer diameter of the opening/closing portion 610. Unless the protruded opening/closing portion 610 passes through the hole 581, the hole 581 may be opened.

According to an embodiment, the hole 581 may have a cylindrical shape and the opening/closing portion 610 may also have a cylindrical shape. However, the present disclosure may not be limited thereto, and the hole 581 and the opening/closing portion 610 may have various shapes. At this time, the hole 581 and the opening/closing portion 610 may have the same shapes.

The floating portion 620 may be formed in a lower end of the opening/closing portion 610. When wash water flows into the chamber 580, the floating portion 620 may be float due to the wash water.

According to an embodiment of the present disclosure, the floating portion 620 may have a cylindrical shape with an empty inside and an open lower surface. However, the present disclosure may not be limited thereto and the floating portion 620 may have various cylindrical shapes. Even in this instance, the lower surface of the floating portion 620 may be open.

According to the shape described above, a pocket 621 may be formed inside the floating portion 620. Based on the air pocket 621, the floating portion 620 may be floating on an upper surface of the wash water. In other words, the floating portion 620 may be floated on the upper surface of the wash water by the air drawn into the air pocket 621, which will be described in detail below.

The connecting portion 630 may extend to the outside of the floating portion 620, and may be configured to connect the floating portion 610 and the hinge 910 with each other.

The connecting portion 630 may include a hinge connection portion 631 and a lever portion 632.

The hinge connection portion 631 may be formed in a shape surrounding an outer circumferential surface of the hinge 910. As one example, when the hinge 910 has a cylindrical shape, the hinge connection portion 631 may have a. ring shape with an empty inside.

The hinge connection portion 631 may not be fixedly coupled to the hinge 910 but it may be coupled to the hinge 910 to facilitate the rotation of the second check valve 600. Specifically, the hinge 910 may extend from the inside of chamber 580 and the hinge connection portion 631 may be inserted in the outer circumferential surface of the hinge 910 to be connected thereto. Accordingly, the hinge connection portion 631 may be rotatable in a clockwise direction and a counter-clockwise direction.

The lever portion 632 may be configured to connect the floating portion 620 with the hinge connection portion 631. Accordingly, the floating portion 620 may be rotatable on the hinge 910. As one example, the floating portion 620 may connect an uppermost end of the floating portion 620 with an uppermost end of the hinge connection portion 631.

Meanwhile, the floating portion 620 having the cylindrical shape may have a constant height and width. As one example, the height of the floating portion 620 may be 12 mm and the width thereof may be 13 mm. however, the present disclosure may not be limited thereto.

According to an embodiment of the present disclosure, a lowermost end of the floating portion 620 may be disposed lower than a lowermost end of the hinge 910 based on the lower surface (i.e., a bottom surface) of the chamber 580. That is, the height of the lowermost end of the floating portion 620 may be smaller than that of the hinge 910, which will be described in detail below.

Meanwhile, according to an embodiment of the resent disclosure, the second check valve 600 may be integrally formed as one body. That is, the opening/closing portion 610, the floating portion 620 and the connecting portion 630 may be formed in one process. In this instance, the opening/closing portion 610, the floating portion 610 and the connecting portion 630 may have the equal weight. In particular, the specific gravity of the second check valve 600 may be lower than that of water.

According to another embodiment of the present disclosure, the second check valve 600 may be formed in separate processes. Specifically, the opening/closing portion 610, the floating portion 620 and the connecting portion 630 may be formed separately. In this instance, the opening/closing portion 610 and the floating portion 620 may be attached by using an adhesive or fastened by a screw to be assembled. Even in this instance, the specific gravity of the floating portion 620 may be lower than that of water.

According to a further embodiment of the present disclosure, the opening/closing portion 610 and the floating portion 620 may be integrally formed with each other, and the connecting portion 630 may be separately formed. The floating portion 620 and the connecting portion 630 may be bonded to each other by using an adhesive or fastened to each other by using a screw to be assembled. Even in this instance, the specific gravity of the floating portion 620 may be lower than that of water.

Referring to FIG. 12, a support portion 920 may be formed inside the chamber 580. The support portion 920 may protrude from an inner surface of the chamber 580. As one example, the chamber 580 may have a cylindrical shape and the present disclosure may not be limited thereto.

The support portion 920 may serve a function of guiding the movement of the second check valve 600. As one example, the support portion 920 may serve a function of limiting downward movement of the second check valve 600.

The support portion 920 may be disposed at a first point between the floating portion 620 and the hinge 910. Here, the first point may be a lower point of the lever portion 632. The support portion 920 may be disposed at a point among the floating portion 620, the hinge 910 and the lever portion 632. Accordingly, the lever portion 632 of the second check valve 600 may be movable between the upper surface of the chamber and the support portion 920.

According to an embodiment of the present disclosure, a lowermost end of the floating portion 620 may be lower than an uppermost end of the support portion 920 with respect to a lower surface (a bottom surface) of the chamber 580, which will be described in detail below.

Referring to FIG. 12, the water jacket 500 may further include a prevention member 930. The prevention member 930 may be disposed inside the chamber 580 and configured to prevent wash water from leaking into the ventilation duct 590. The prevention member 930 may be attached to a lower surface of the upper end of the chamber 580.

More specifically, when the hole 581 and the opening/closing portion 610 are formed in the cylindrical shape, the prevention member 930 may he formed in a cylindrical shape with an empty inside. In this instance, the size of the empty inside of the prevention member 930 may be corresponding to that of the inside of the hole 930. As one example, when the hole 581 and the opening/closing portion 610 are formed in the cylindrical shape, the prevention member 930 may be formed in a ring shape with an empty inside. An inner diameter of the hole 581 may be equal to an inner diameter of the prevention member 930. When the opening/closing member 610 moves upward, a lower area of the opening/closing portion 610 may be inserted in the hole 581 while contacting with a lower surface of the prevention member 930. Accordingly, the lower surface of the prevention member 930 may be in line contact with the lower area of the opening/closing portion 610.

Figure 13:
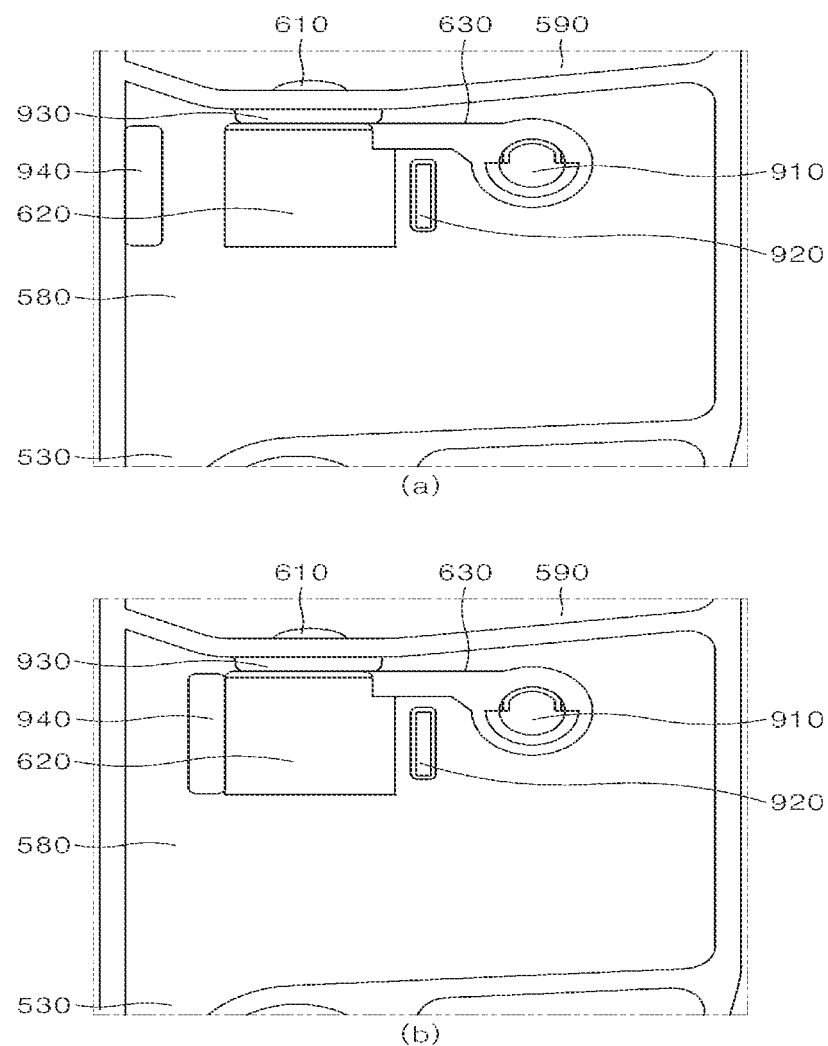
FIG. 13 is a view showing a shape of a reinforcing rib according to an embodiment of the present disclosure.

Meanwhile, a reinforcing rib 940 may be formed inside the chamber 580 as shown in FIG. 13.

The reinforcing rib 940 may serve a function of guiding the second check valve 600 moving upward. In other words, when the second check valve 600 moves, the reinforcing rib 940 may serve a function of preventing the second check valve 600 from escaping from the chamber 580 in a right-left direction.

According to an embodiment of the present disclosure, the reinforcing rib 940 may be formed on one surface inside the chamber 580 as shown in FIG. 13(a).

Specifically, the reinforcing rib 940 may be formed in a lateral surface that faces a first lateral surface of the hinge 910 inside the chamber 580. Here, the second check valve 600 may be disposed on the first lateral surface of the hinge 910. The reinforcing rib 940 may be disposed to face one surface of the second check valve 600. The reinforcing rib 940 formed inside the chamber 580 may be fixed not move. Although not shown in the drawings, the reinforcing rib 940 may be formed in a first lateral surface on which the hinge 910 is disposed.

According to another embodiment of the present disclosure, the reinforcing rib 940 may be formed on an outer circumferential surface of the second check valve 600. In other words, the second check valve 600 may further include the reinforcing rib 940 as shown in FIG. 13(b).

Specifically, the reinforcing rib 940 may be formed on the outer circumferential surface of the floating portion 620 in a direction opposite to the direction in which the connecting portion 630 is formed. Here, the length of the reinforcing rib 940 may be equal to that of the floating portion 620, but the present disclosure may not be limited thereto. In this instance, the reinforcing rib 940 may be connected to the floating portion 620. When the floating portion 620 moves in a vertically, the reinforcing rib 940 may also move in the vertical direction together with the floating portion 620. Although not shown in the drawings, the reinforcing rib 940 may be formed on the outer circumferential surface of the floating portion 620 in a direction in which the connecting portion 630 is formed.

Hereinafter, the structure and operation of the second check valve 600 will be described.

The wash water contaminated after performing the dishwashing may be stored in the sump 402 and then flow into the sump water discharge connection hole 552 connected to a first end of the lower end of the second water discharge path 530. The contaminated wash water may be discharged to the water discharge hose connection hole 554 connected to a second end of the lower end of the second water discharge path 530.

At this time, when the water discharge hose connected to the outside of the dishwasher 300 is disposed at a low height, the pressure of the wash water may be applied to the second end of the second water discharge path 530 to move the wash water to the upper end of the second water discharge path 530. Accordingly, the wash water may flow into the chamber 580. When the wash water does not backflow, the opening/closing portion 610 of the second check valve 600 may not be inserted in the hole 581 and the hole 581 may be opened.

When wash water continuously flows into the chamber 580, a water level inside the chamber 381 may increase and a surface of the wash water may be in contact with some area of the lower end of the floating portion 620.

After that, all area of the lower end of the floating portion 620 may be in contact with the surface of the wash water and the air pocket 621 may be filled with air. At this time, the floating portion 620 may be moved upward by the buoyancy generated by wash water. The opening/closing portion 610 together with the floating portion 620 may move upward to close the hole 581 so that the backflow of wash water to the ventilation duct 590 may be prevented.

In short, according to the present disclosure, the check valve 600 may be connected with the hinge 910 disposed inside the chamber 580. Accordingly, even if it is floated, the check valve 600 may be secured at a constant position inside the chamber 580.

In addition, the floating portion 620 provided in the check valve 600 may be formed in the shape with an empty inside. Since air is filled in the air pocket 621 provided in the floating portion 620, the buoyancy of the check valve 600 may be increased.

Meanwhile, when the second check valve 600 is all submerged in the wash water due to inflow of wash water, a relationship shown in Formula 1 below may be established in relation to the buoyancy of the second check valve 600.

$$(M_{X+Y} \times V_{X+Y} \times g) \leq (M_{air} \times V_{airpocket} \times g) + (M_{water} \times V_{X+Y} \times g)$$ [Formula 1]

Here, X denotes the opening/closing portion 610 and the floating portion 620. Y denotes the lever portion 632 and M denotes density. V denotes volume and g denotes the gravity acceleration. 'Water' denotes wash water.

To increase the buoyancy of the second check valve 600, the volume of the opening/closing portion 610 and the floating portion 620 should be maximized. At this time, when the lowermost end of the hinge 910 is higher than the lowermost end of the floating portion 620 the volume of the opening/closing portion 610 and the floating portion 620 may be maximized. Accordingly, the height of the lowermost end of the floating portion 620 may be smaller than that of the lowermost end of the hinge 910 with respect to the lower surface of the chamber 580.

In addition, to maximize the volume of the opening/closing portion 610 and the floating portion 620, the height of the lowermost end of the floating portion 620 may be smaller than that of the uppermost end of the support portion 940 with respect to the lower surface of the chamber 580.

The opening/closing portion 610 and the floating portion 620 may be made of a material having a specific gravity lower than that of water. Accordingly, the check valve 600 may flow better and the buoyancy of the check valve 600 may be further increased.

Due to the structure of the check valve 600 described above, it may be possible to prevent sticking by contaminants contained in the wash water, chattering of the second check valve 600 and a failure (i.e., a non-operation) of the second check valve 600.

In addition, since the prevention member 930 configured to prevent the backflow of the wash water is disposed in the lower end of the hole 581, the sealing performance of the wash water to the ventilation duct 590 may be further increased, and the sticking of the wash water caused by contaminants in the wash water may be prevented.

In addition, the support portion 920 configured to limit the movement of the second check valve 600 may formed inside the chamber 580, thereby solving the disadvantage that the second check valve 600 does not float by moving downward.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

The invention claimed is:

1. A water jacket of a dishwasher, the water jacket comprising:
   a water discharge path configured to discharge wash water to an outside of the dishwasher;
   a chamber in fluid communication with an upper end of the water discharge path;
   a check valve disposed inside the chamber; and
   a hinge disposed in the chamber and connected to the check valve,
   wherein the chamber has a surface that is in fluid communication with the water discharge path, the chamber having a hole defined at an upper end of the chamber, and
   wherein the check valve comprises:
      an opening/closing portion configured to open and close the hole of the chamber,
      a floating portion disposed below the opening/closing portion, and
      a connection portion that extends from an outside of the floating portion and connects the floating portion to the hinge.

2. The water jacket of claim 1, wherein the floating portion defines a pocket that is a space defined inside the floating portion and has an open lower end, the open lower end of the pocket being surrounded by a lower end of the floating portion.

3. The water jacket of claim 2, wherein the pocket is configured to accommodate air therein, and
   wherein the floating portion is configured to, based on wash water introduced into the chamber contacting the lower end of the floating portion, move upward by buoyancy to thereby move the opening/closing portion to the hole.

4. The water jacket of claim 1, wherein a lower end of the floating portion is disposed below a lowermost end of the hinge.

5. The water jacket of claim 1, wherein a specific gravity of the floating portion is less than a specific gravity of water.

6. The water jacket of claim 1, wherein the opening/closing portion comprises a protrusion configured to pass through the hole to thereby close the hole.

7. The water jacket of claim 6, further comprising a prevention member attached to a lower surface of the upper end of the chamber and configured to block leakage of wash water between the check valve and the upper end of the chamber, and
   wherein the prevention member has:
      an inner surface in contact with an outer circumferential surface of the opening/closing portion, and
      a lower surface in contact with an upper surface of the floating portion.

8. The water jacket of claim 7, wherein the hole, the opening/closing portion, and the prevention member have a cylindrical shape,
   wherein the prevention member defines an inside opening, and
   wherein a size of the inside opening of the prevention member is equal to a size of the hole of the chamber.

9. The water jacket of claim 1, further comprising:
   a support portion disposed inside the chamber and configured to guide movement of the check valve.

10. The water jacket of claim 9, wherein an uppermost end of the support portion is disposed above a lowermost end of the floating portion.

11. The water jacket of claim 9, wherein the connection portion comprises:
   a hinge connection portion connected to the hinge; and
   a lever portion that connects the floating portion to the hinge connection portion, and
   wherein the support portion is disposed at a first position between the floating portion and the hinge, the first position being below the lever portion, and
   wherein the floating portion is configured to move toward and away from an upper surface of the chamber based on rotation of the lever portion about the hinge.

12. The water jacket of claim 1, wherein the water discharge path has:
   a first end disposed at a lower portion of the water discharge path and configured to receive wash water from a sump of the dishwasher; and
   a second end disposed at the lower portion of the water discharge path, the sump being configured to discharge wash water to the second end of the water discharge path, and wherein the water discharge path is configured to, based on the sump discharging wash water to the second end, receive and guide the wash water to the upper end of the water discharge path by a water pressure applied to the second end to thereby supply the wash water into the chamber.

13. The water jacket of claim 1, further comprising:
a rib disposed at a lateral surface inside the chamber or at an outer circumferential surface of the floating portion, the rib being configured to limit a left-and-right movement of the floating portion relative to the lateral surface of the chamber.

14. A water jacket of a dishwasher, the water jacket comprising:
a water discharge path configured to discharge wash water to an outside of the dishwasher;
a chamber having a lower end that is in fluid communication with an upper end of the water discharge path, the chamber having a hole defined at an upper end of the chamber;
a hinge disposed in the chamber;
a check valve disposed in the chamber and connected to the hinge; and
a support portion disposed in the chamber and configured to limit downward movement of the check valve,
wherein the check valve comprises:
an opening/closing portion configured to open and close the hole,
a floating portion disposed at a lower end of the opening/closing portion, and
a connection portion that extends from an outside of the floating portion and connects the floating portion to the hinge, and
wherein a lowermost end of the floating portion is disposed below a lower end of the hinge or an uppermost end of the support portion.

15. A dishwasher comprising:
a case;
a tub disposed inside the case;
a sump disposed below the tub and configured to store wash water;
a water jacket disposed between the case and the tub and configured to supply wash water to the sump and to discharge the wash water stored in the sump, the water jacket comprising:
a water discharge path configured to discharge the wash water to an outside of the dishwasher,
a chamber in fluid communication with an upper end of the water discharge path, the chamber having a hole defined at an upper end of the chamber,
a check valve disposed inside the chamber, and
a hinge disposed in the chamber and connected to the check valve,
wherein the check valve comprises:
an opening/closing portion configured to open and close the hole of the chamber,
a floating portion disposed below the opening/closing portion, and
a connection portion that extends from an outside of the floating portion and connects to the hinge.

16. The dishwasher of claim 15, wherein the floating portion defines a pocket that is a space defined inside the floating portion and has an open lower end, the open lower end of the pocket being surrounded by a lower end of the floating portion.

17. The dishwasher of claim 16, wherein the pocket is configured to accommodate air therein, and
wherein the floating portion is configured to, based on wash water introduced into the chamber contacting the lower end of the floating portion, move upward by buoyancy to thereby move the opening/closing portion to the hole.

18. The dishwasher of claim 15, wherein the water jacket further comprises a prevention member attached to a lower surface of the upper end of the chamber and configured to block leakage of wash water between the check valve and the upper end of the chamber, and
wherein the prevention member has:
an inner surface in contact with an outer circumferential surface of the opening/closing portion, and
a lower surface in contact with an upper surface of the floating portion.

19. The dishwasher of claim 15, wherein the water jacket further comprises a support portion disposed inside the chamber and configured to guide movement of the check valve, and
wherein an uppermost end of the support portion is disposed above a lowermost end of the floating portion.

20. The dishwasher of claim 19, wherein the connection portion comprises:
a hinge connection portion connected to the hinge; and
a lever portion that connects the floating portion to the hinge connection portion, and
wherein the support portion is disposed at a first position between the floating portion and the hinge, the first position being below the lever portion, and
wherein the floating portion is configured to move toward and away from an upper surface of the chamber based on rotation of the lever portion about the hinge.

* * * * *